US009321187B2

(12) United States Patent
Wiley et al.

(10) Patent No.: US 9,321,187 B2
(45) Date of Patent: Apr. 26, 2016

(54) PROCESS FOR FABRICATION OF HIGH-HARDNESS, FINE-GRAINED, COMPLEX-SHAPED SILICON CARBIDE ARTICLES

(71) Applicants: Charles Schenck Wiley, Charlotte, NC (US); Robert F. Speyer, Atlanta, GA (US)

(72) Inventors: Charles Schenck Wiley, Charlotte, NC (US); Robert F. Speyer, Atlanta, GA (US)

(73) Assignee: VERCO MATERIALS, LLC, Atlanta, GA (US)

( * ) Notice: Subject to any disclaimer, the term of this patent is extended or adjusted under 35 U.S.C. 154(b) by 0 days.

(21) Appl. No.: 13/955,898

(22) Filed: Jul. 31, 2013

(65) Prior Publication Data
US 2014/0038808 A1 Feb. 6, 2014

Related U.S. Application Data

(60) Provisional application No. 61/677,869, filed on Jul. 31, 2012.

(51) Int. Cl.
*B28B 11/24* (2006.01)
*C04B 35/565* (2006.01)
(Continued)

(52) U.S. Cl.
CPC ............... *B28B 11/24* (2013.01); *C04B 35/565* (2013.01); *C04B 35/5755* (2013.01); *C04B 35/62821* (2013.01); *C04B 35/62831* (2013.01); *C04B 35/62839* (2013.01); *C04B 35/62886* (2013.01); *C04B 2235/3232* (2013.01); *C04B 2235/383* (2013.01); *C04B 2235/3813* (2013.01); *C04B 2235/3821* (2013.01); *C04B 2235/425* (2013.01); *C04B 2235/449* (2013.01); *C04B 2235/48* (2013.01); *C04B 2235/5445* (2013.01); *C04B 2235/656* (2013.01); *C04B 2235/6562* (2013.01); *C04B 2235/77* (2013.01); *C04B 2235/784* (2013.01); *C04B 2235/785* (2013.01); *C04B 2235/786* (2013.01); *C04B 2235/80* (2013.01); *C04B 2235/95* (2013.01)

(58) Field of Classification Search
CPC ......................... C04B 35/565; C04B 35/62655
See application file for complete search history.

(56) References Cited

U.S. PATENT DOCUMENTS

| 4,327,186 | A | | 4/1982 | Murata et al. | .................. 501/92 |
| 4,753,903 | A | * | 6/1988 | Saito | .............................. 501/88 |
| 4,777,152 | A | * | 10/1988 | Tsukada | ........................ 501/80 |

(Continued)

FOREIGN PATENT DOCUMENTS

| KR | 2003-0054077 | 7/2003 |
| WO | WO 2012/170069 | 12/2012 |

OTHER PUBLICATIONS

Korean Office Action dated Oct. 14, 2014 issued in corresponding Korean Application No. 10-2013-7019394 (with English translation).

(Continued)

*Primary Examiner* — Russell Kemmerle, III
(74) *Attorney, Agent, or Firm* — Ostrolenk Faber LLP

(57) ABSTRACT

A process for the fabrication of a SiC-based article that includes preparing an aqueous suspension with SiC powder, a titanium source, a carbon source and boron carbide powder, spray drying the mixture to obtain a powder, preparing a green body from the powder, applying heat treatment to the green body in a pyrolysis/thermolysis step, pressureless sintering the green body, optimally followed by HIPing for further densification.

19 Claims, 11 Drawing Sheets

Geometric sintered relative densities of compositions 1-12.

(51) Int. Cl.
*C04B 35/575* (2006.01)
*C04B 35/628* (2006.01)

(56) References Cited

U.S. PATENT DOCUMENTS

| | | | |
|---|---|---|---|
| 4,957,884 A | 9/1990 | Knudsen et al. | 501/87 |
| 5,021,368 A | 6/1991 | Hoffman et al. | |
| 5,032,242 A | 7/1991 | Knudsen et al. | 204/157.41 |
| 5,108,962 A | 4/1992 | Khazai et al. | 501/87 |
| 5,227,345 A | 7/1993 | Howard et al. | |
| 5,342,811 A | 8/1994 | Khazai et al. | |
| 5,543,370 A | 8/1996 | Sigl et al. | 501/92 |
| 5,656,563 A * | 8/1997 | Chen et al. | 501/90 |
| 5,976,429 A * | 11/1999 | Chen et al. | 264/29.6 |
| 7,442,661 B2 | 10/2008 | Hirao et al. | 501/87 |
| 8,128,861 B1 * | 3/2012 | Aghajanian et al. | 264/682 |
| 8,357,623 B2 * | 1/2013 | Lillo et al. | 501/92 |
| 2008/0115424 A1 | 5/2008 | Can et al. | |
| 2010/0248930 A1 | 9/2010 | Lillo et al. | 501/92 |
| 2010/0285947 A1 | 11/2010 | Weir et al. | |
| 2011/0028301 A1 | 2/2011 | Vargas-Gonzalez et al. | 501/90 |
| 2011/0227259 A1 | 9/2011 | Pujari et al. | |

OTHER PUBLICATIONS

Japan Office Action mailed Nov. 4, 2014 issued in corresponding Japanese Patent Application No. 2013-547650 (with an English translation).
Hayashi, Shinsuke et al., "TiB$_2$—B$_4$C Composites Pressureless-Sintered Using Ni and C as Densification Aids", Journal of the Ceramic Society of Japan, vol. 101, pp. 154-158 (1993).
Prochazka and R. M. Scanlan, "Effect of Boron and Carbon on Sintering of Silicon Carbide," J. Am. Ceram. Soc., 58 [1-2] 72 (1975).
D. R. Lide, Ed. CRC Handbook of Chemistry and Physics, 81st Ed., CRC Press, Boca Raton, FL, p. 12-211-12-212, 2000-2001.
L. Vargas-Gonzalez, R.F. Speyer and J. Campbell, "Flexural Strength, Fracture Toughness, and Hardness of Silicon Carbide and Boron Carbide Armor Ceramics," Int. J. of Appl. Ceram. Tech., 7 [5] 643-651 (2010).
J. H. She and K. Ueno, "Densification Behavior and Mechanical Properties of Pressureless-Sintered Silicon Carbide Ceramics with Alumina and Yttria Additions," Mater. Chem. Phys., 59 139-142 (1999).
ASTM International, Standard Test Method for Vickers Indentation Hardness of Advanced Ceramics. Annual Book of ASTM Standards ASTM C1327-08, ASTM International, West Conshohocken, PA, 2007.
ASTM International, Standard Test Method for Knoop Indentation Hardness of Advanced Ceramics. Annual Book of ASTM Standards ASTM C1326-03, ASTM International, West Conshohocken, PA, 2007.
K. Niihara, A. Nakahira, and T. Hirai, "The Effect of Stoichiometry on Mechanical Properties of Boron Carbide" J. Amer. Ceram. Soc., 67 [1] C13-C14 (1984).
International Search Report dated Aug. 17, 2012 issued in corresponding International patent application No. PCT/US2011/067618.
Supplementary Partial European Search Report dated Jan. 27, 2015.
B.-S. Lee et al., "Low-temperature processing of B4C—Al composites via infiltration technique," Materials Chemistry and Physics 67:249-255-(2001).
H. Abdizadeh et al., "Investigation on Addition of B4C Particles Coated by Nano-TiB2 on Microstructure and Mechanical Behavior of Al—B4C Composites," International Conference on Smart Materials and Nanotechnology in Engineering, vol. 6423 (2007).
Japanese Office Action dated Jun. 22, 2015 issued in Japanese Application No. 2013-547650 with English translation.
European Extended Search Report dated Aug. 6, 2015 issued in European Application No. 11867200.5.

* cited by examiner

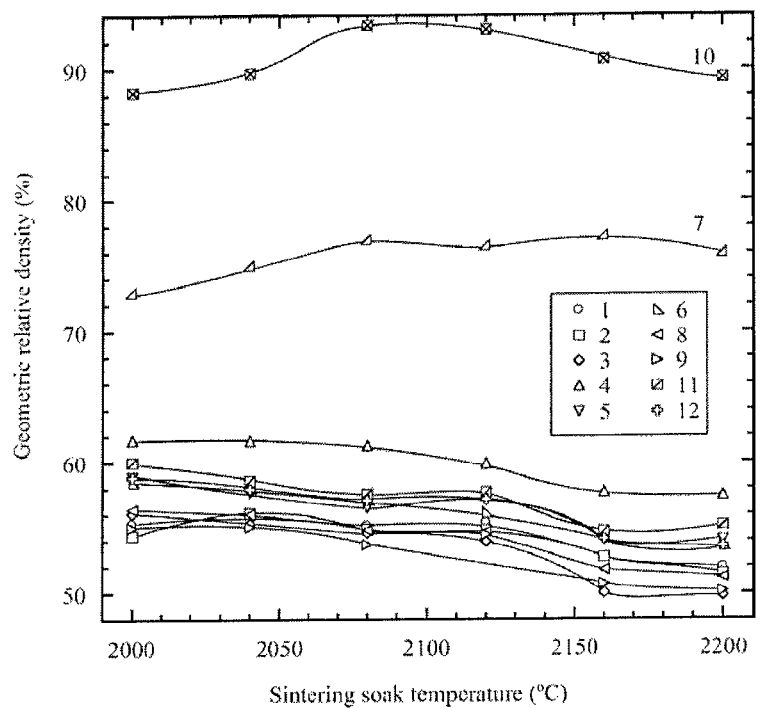
Figure 1: Geometric sintered relative densities of compositions 1-12.
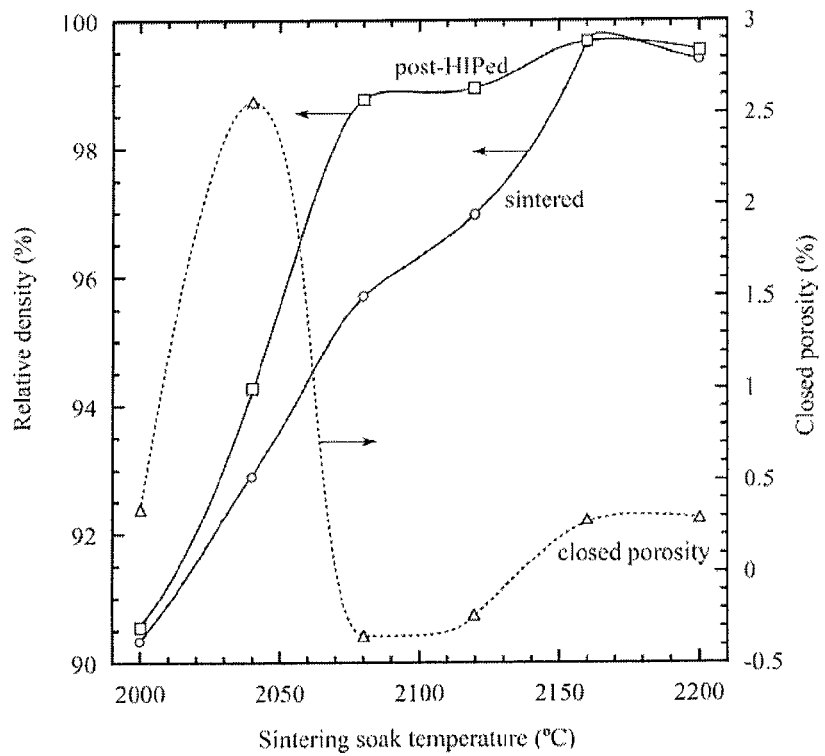
Figure 2: Composition 10 sintered and post-HIPed relative densities as well as closed porosity.

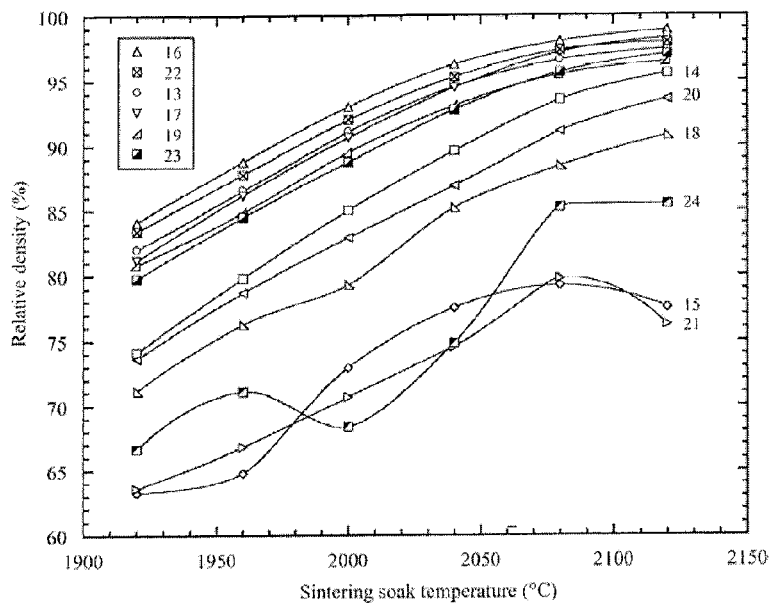
Figure 3: Archimedes sintered relative densities for compositions 13-24.
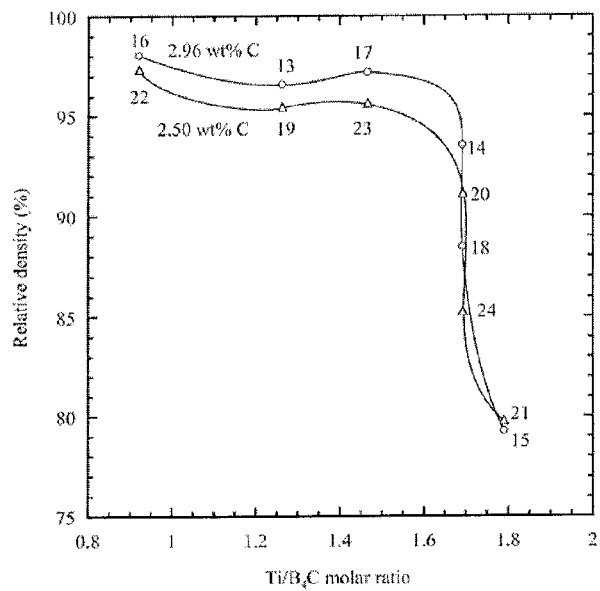
Figure 4: Effect of Ti/B$_4$C molar ratio on Archimedes sintered relative densities for compositions 13-24 sintered at a soak temperature of 2080°C. Composition numbers are indicated in the figure.

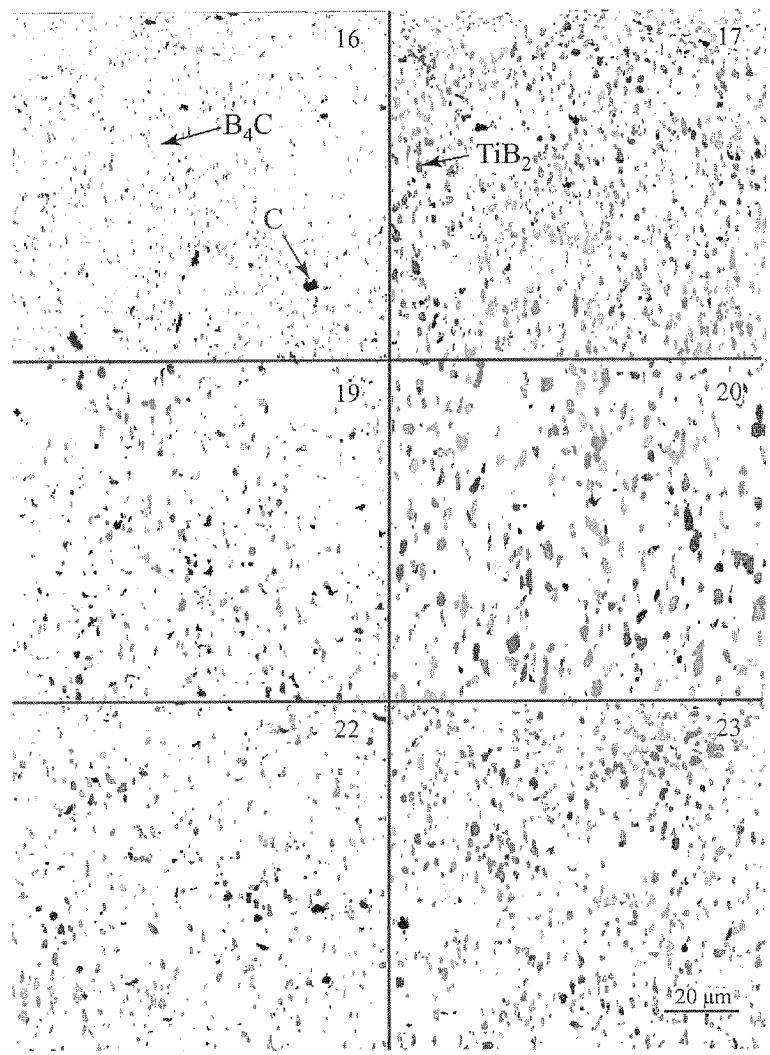
Figure 10: Image analysis based on EDS area scans of SEM images.
Compositions and sintering soak temperatures correspond to those in Figure 9.

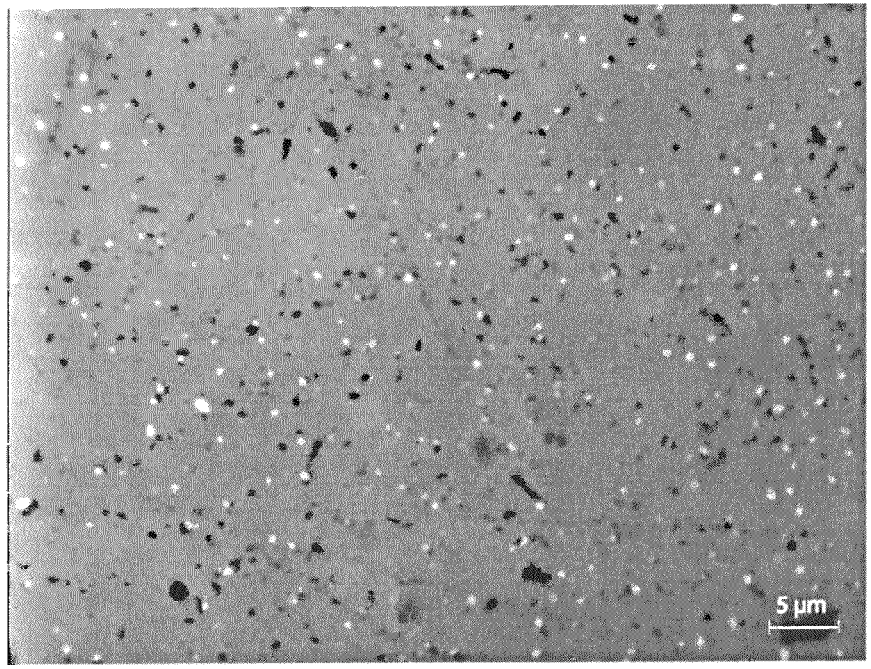
Figure 11: Optical microscopy image of polished surface of SiC composition 16 (sintered at 2000°C and post-HIPed).
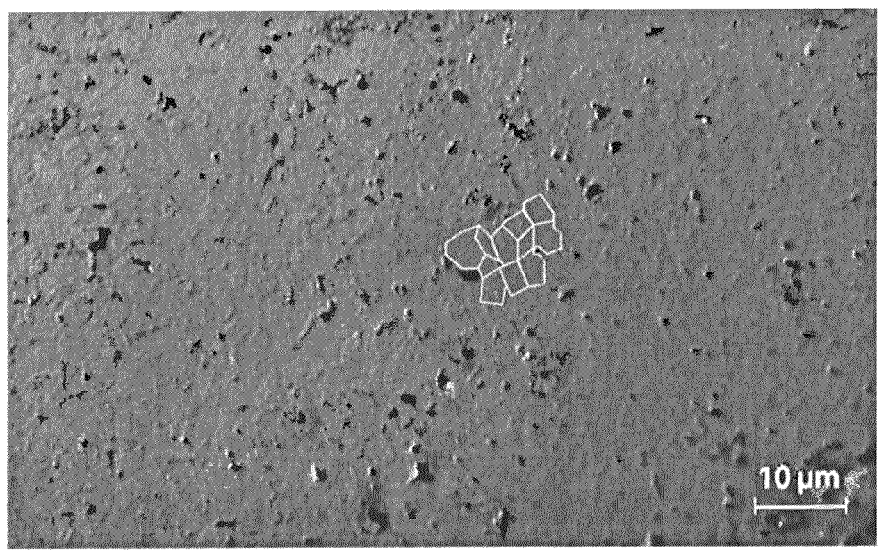
Figure 12: Optical microscopy image of etched surface of SiC composition 16 (sintered at 2000°C and post-HIPed). Grain boundaries of some grains are drawn over to facilitate visual clarity.

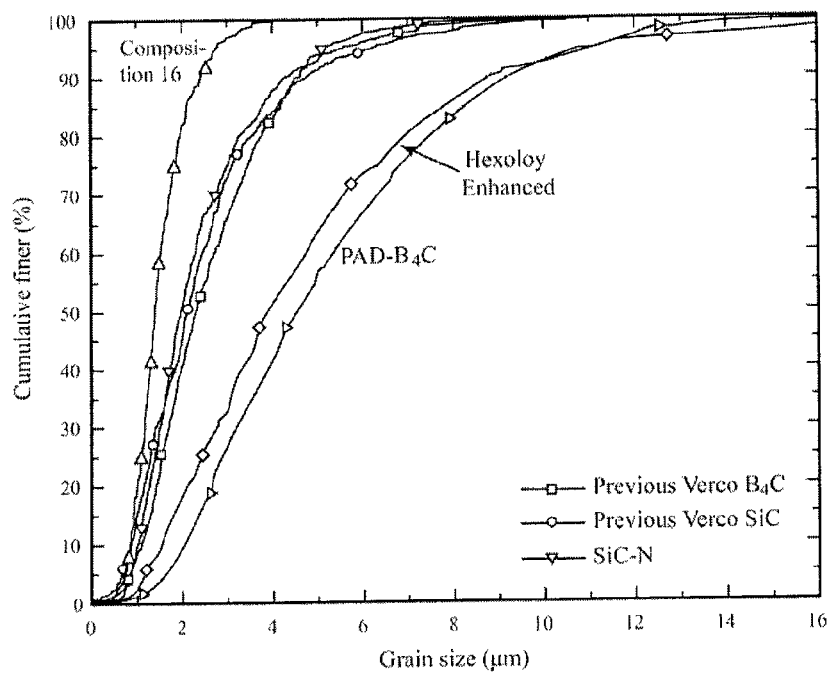
Figure 13. Grain size distribution for composition 16 (10.2 cm × 10.2 cm tile, sintering soak temperature of 2000°C and post-HIPed) as well as distributions of other [1] high-hardness armor ceramics.

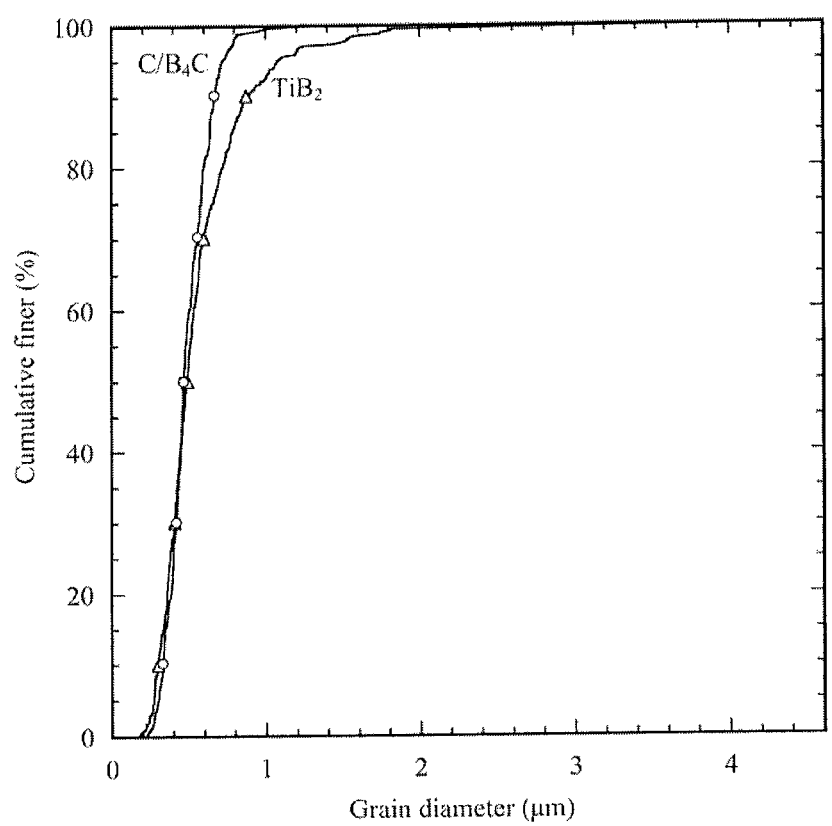
Figure 14: Grain size distribution for second phases in the microstructure shown in Figure 11.

PROCESS FOR FABRICATION OF HIGH-HARDNESS, FINE-GRAINED, COMPLEX-SHAPED SILICON CARBIDE ARTICLES

CROSS REFERENCE TO RELATED APPLICATION

The present application claims priority to U.S. Provisional Patent Application No. 61/677,869, filed Jul. 31, 2012, the entire contents of which are incorporated in full herein by reference.

FIELD OF INVENTION

The invention disclosed herein relates to a process for fabricating a ceramic article, and in particular to a process for fabricating a silicon carbide (SiC) based ceramic article.

DEFINITIONS

As used herein, SiC-based or silicon carbide based means no less than 80% of the total weight of the composition is SiC.

As used herein about means rounded to the nearest tenth.

All percentages expressed herein for the specimens prepared according to the present invention (see Tables 1 and 2 below) refer to the relative weight of the component to the total dry weight of the silicon carbide used for the preparation of the specimen.

BACKGROUND

Silicon carbide is the fifth hardest known material behind diamond. The high hardness of SiC combined with its relatively low weight (theoretical density: 3.21 g/cm$^3$) and cost have made SiC one of the preferred materials for the strike face of personal and vehicular armor systems, to stop; for example, armor piercing bullets.

The high temperature stability and creep resistance, chemical stability, and abrasion resistance of SiC have also made silicon carbide a prominent material in refractory, wear, seal, and chemical processing applications.

Prochazka et al. (S. Prochazka and R. M. Scanlan, "Effect of Boron and Carbon on Sintering of Silicon Carbide," J. Am. Ceram. Soc., 58 [1-2] 72 (1975)) were the first to report a process for forming dense (about 96.4% relative density) SiC microstructures through solid-state pressureless sintering. In that process, phenolic resin (0.25-0.5 wt %), a carbon source after pyrolysis, and B$_4$C (0.36 wt %) were added to fine (0.13 μm) β-SiC powders. The carbon additive was believed to be responsible for the removal of SiO$_2$ coatings on SiC particles (2C$_{(s)}$+SiO$_{2(l)}$=SiC$_{(s)}$+CO$_{2(g)}$), and B$_4$C was believed to enhance solid state diffusion by near-grain boundary vacancy formation (via limited solubility of boron in the SiC structure). As opposed to liquid phase sintered SiC (facilitated, for example, by Y$_2$O$_3$ and Al$_2$O$_3$ additions), solid state sintered SiC has a higher hardness, better chemical durability and high temperature creep resistance.

PCT/US2011/106768 discloses a process for the fabrication of boron carbide parts with no porosity with a median grain size approaching the starting median particle size (d$_{50}$=0.8 μm), and higher Vickers hardness values than previously obtainable by pressureless sintering techniques. That process is based on the use of two water-soluble chemical additives yielding sintering aids/grain growth inhibitors after thermal decomposition, careful selection of heat-treatment schedules, and utilization of a sub-micron B$_4$C powder of narrow particle size distribution. In that process, carbon additions in the form of water-soluble phenolic resin, and titanium additions in the form of a water-soluble source (C$_6$H$_{10}$O$_8$Ti.2(NH$_4$)) facilitate intimate coating of the boron carbide particles in the boron carbide powder with a titanium source and a carbon source. The sources of titanium and carbon are then thermally decomposed (preferably through pyrolysis) after the coated boron carbide particles are formed into a green body. The green body is subjected to pressureless sintering after it is subjected to a heat treatment step to pyrolyze the titanium and the carbon sources.

SUMMARY OF THE INVENTION

A process according to the preferred embodiment of the present invention includes the application of the additions used in the process disclosed in PCT/US2011/06768 to facilitate the synthesis of high-hardness silicon carbide articles.

In a process according to the preferred embodiment of the present invention, boron carbide is included as an additive along with water-soluble carbon and titanium sources.

The amount of boron carbide selected for a process according to the present invention is adequate to form TiB$_2$ from titania, as well as having remnant B$_4$C in the microstructure to function as a sintering aid.

A process for fabrication of a SiC-based article according to the present invention includes preparing an aqueous suspension of SiC powder with a first amount of water soluble source of titanium, a second amount of water soluble carbon source and a third amount of boron carbide powder; drying the aqueous suspension, preferably by spray drying, to obtain a first SiC-based powder mass containing SiC particles with a titanium and carbon containing coating, and binder; preparing a green body from the SiC-based powder mass; thermally decomposing the titanium source and the carbon source in the green body, preferably by pyrolysis; and pressureless sintering the green body after the thermally decomposing step at a sintering soak temperature to obtain a pressureless sintered body.

The pressureless sintered body may be further densified by hot isostatic pressing. Preferably, the sintering soak temperature will result in a relative density of at least 95%, and more preferably at least 97% as the data presented herein indicates that pressureless sintered bodies with 97% relative density or higher sintered to full theoretical density after HIPing.

Preferably, median particle sizes of particles in the SiC powder are less than one micron.

In the preferred embodiment, the water soluble source of titanium is ammonium lactato titanium (IV) (an organometallic compound), and the water soluble source of carbon is water soluble phenolic resin.

According to another aspect of the present invention, the first amount is selected to yield titanium dioxide after thermal decomposition of the titanium source.

According to one aspect of the present invention, the first amount is selected to produce a titanium content in the green body after thermal decomposition that is more than about 1% but less than about 6.5% (preferably less than 4%) of the dry weight of the SiC powder in the aqueous suspension, the second amount is selected to produce a carbon content in the green body after thermal decomposition that is more than 2% but less than about 3% of the dry weight of the SiC powder in the aqueous suspension, and the third amount is more than about 1% to less than about 4.5% (preferably about 3%) of the total dry weight of the SiC powder in the aqueous suspension, wherein the first amount is selected so that the molar ratio of titanium to boron carbide will be less than 1.7 after thermal decomposition, and preferably less than 1.6.

According to the present invention, a silicon carbide based product can be attained that includes about 1.00%-3.5% titanium (in the form of $TiB_2$), more than 2% to about 3% carbon, about 1% to about 3% boron carbide, and the balance silicon carbide and unavoidable impurities, wherein the percentages are calculated relative to the total dry weight of silicon carbide used in the preparation.

According to an aspect of the present invention, the carbon content in the silicon carbide is at least 2% relative to the total weight of silicon carbide and the molar ratio of titanium to boron carbide is about 1.6 or less, in which the boron carbide content is preferably less than 1.5% of the weight of the silicon carbide.

When a process according to the present invention is properly controlled (proper composition and sintering), a sintered silicon carbide based body can be attained having no more than twice the original median powder particle size of the silicon carbide powder used in the process, which is indicative of surprisingly little grain growth during sintering. As a reference, it is well known that significant grain growth (10 to 20 times) of the starting silicon powder occurs during sintering. Disclosed herein are silicon carbide articles that have surprisingly avoided the problem encountered in the prior art. A silicon carbide based material according to an embodiment of the present invention has a fine grain size with zero residual porosity. These properties have resulted in a very high hardness, which should translate to having superior abrasion resistance, ballistic stopping power, and the like, making some of the examples disclosed herein superior products for armor or the like.

BRIEF DESCRIPTION OF THE FIGURES

FIG. 1 discloses geometric sintered relative densities for a first group of specimens prepared according to the present invention.

FIG. 2 discloses sintered and post-HIPed relative densities for a specimen based on composition 10, Table 1 (below) prepared according to the present invention.

FIG. 3 discloses Archimedes sintered relative densities for a second group of specimens prepared with a process according to the present invention.

FIG. 4 discloses the effect of Ti/$B_4C$ molar ratio on Archimedes sintered relative densities for specimens prepared with a process according to the present invention sintered at a soak temperature 2080° C. The numbers in the figures refer to composition numbers from the Tables (see below).

FIG. 10 discloses image analysis based on EDS area scans of SEM images. $TiB_2$, $B_4C$ and graphite are represented by three different grey scale shadings, as indicated. Compositions and sintering soak temperatures correspond to those in FIG. 9.

FIG. 11 discloses an optical microscopy image of polished surfaces of a specimen prepared with a process according to the present invention (sintered at 2000° C. and post-HIPed).

FIG. 12 discloses an optical microscopy image of the etched surface of a specimen prepared with a process according to the present invention (sintered at 2000° C. and post-HIPed). Grain boundaries of some grains are drawn over to facilitate visual clarity.

FIG. 13 discloses grain size distribution for the specimen of FIG. 12 (10.2 cm×10.2 cm tile, sintering soak temperature of 2000° C. and post-HIPed) as well as distributions of other high-hardness armor ceramics.

FIG. 14 graphically illustrates the grain size distribution for second phases ($TiB_2$, graphite/$B_4C$) in the microstructures shown in FIG. 11.

DETAILED DESCRIPTION

Figure 5:
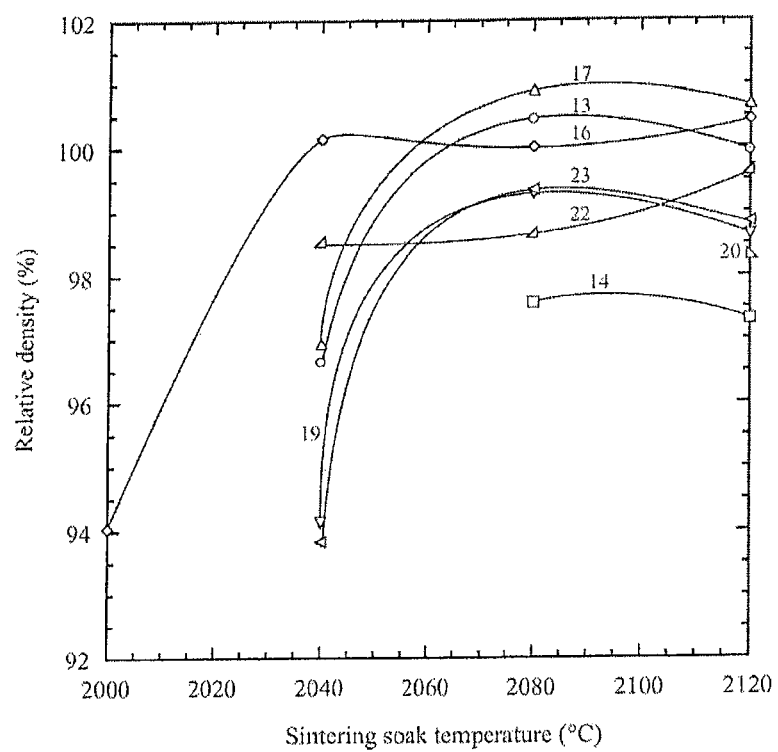
FIG. 5 discloses Archimedes relative densities of eight post-HIPed specimens prepared according to the present invention which sintered to high relative density. Values above 100% are interpreted to be a result of inaccuracy in the estimation of theoretical density via the rule of mixtures.

A process for fabrication of a SiC-based article includes preparing an aqueous suspension of SiC powder with a first amount of water soluble source of titanium, a second amount of water soluble carbon source and a third amount of boron carbide powder; spray drying (spray drying is preferred because it is less likely to cause additive segregation) the aqueous suspension to obtain a first SiC-based powder mass containing SiC particles coated with a titanium and carbon containing coating; preparing a green body from the SiC-based powder mass; thermally decomposing the titanium and the carbon sources in the coating of the particles by application of heat preferably in vacuum (pyrolysis) to the green body; and pressureless sintering the green body under vacuum at a soak temperature (preferably above 2000° C.) thereafter to obtain a pressureless sintered body.

The pressureless sintered body may be hot isostatically pressed (HIPed) to further densify the body and improve its mechanical properties, specially its hardness.

It should be noted that an advantage of a process according to the present invention is that articles having complex shapes can be obtained in near-net shape without machining after the article has been fully sintered. To be more specific, through pressureless sintering, a green body can be first sintered to a closed porosity state (e.g. 96% relative density or higher), and then HIPed to near theoretical density (99% relative density or higher), thereby retaining the shape of the green body (near-net shape) and avoiding any significant post-densification shaping as, for example, may be required when hot pressing is employed for densification. That is, because the final shape of the article can be the shape of the green body, it is possible to use simple green-body forming techniques (e.g. pressing, extrusion, slip casting) techniques to control the final shape of the article.

According to one embodiment of the present invention, the median particle sizes of particles in the SiC powder are less than 1 micron, and the resulting SiC-based article will have silicon carbide grain sizes close to the median sizes of the particles in the SiC powder. Specifically, the median grain sizes of the silicon carbide phase in the final product will be no more than 200% of the median particle size of the particles in the silicon carbide powder. Thus, advantageously a process according to the present invention allows for controlling the final median grain sizes of the silicon carbide phase whereby allowing for improvement in the mechanical properties of silicon carbide based article, especially its hardness.

In the preferred embodiment, the water soluble source of titanium may be ammonium lactato titanium (IV) ($C_6H_{10}O_8Ti.2(NH_4)$), and the preferred water soluble source of carbon may be water soluble phenolic resin.

In the preferred embodiment, the amount of the titanium source is selected to produce a titanium content in the green body after thermal decomposition that is more than 1% but less than 6.5% (preferably less than 4%) of the dry weight of the SiC powder in the aqueous suspension, the amount of the carbon source is selected to produce a carbon content in the green body after the thermal decomposition that is more than 2% but less than about 3% of the dry weight of the SiC powder in the aqueous suspension, and the amount of boron carbide is about 1% to less than 4.5% (preferably less than 3%) of the total dry weight of the SiC powder in the aqueous suspension.

According to an aspect of the present invention, the amount of titanium source is selected so that the molar ratio of titanium to boron carbide in the final article will be less than about 1.7 and preferably below 1.6.

As disclosed below, through a process according to the present invention, SiC-based articles may be obtained with final microstructures having no porosity, average grain size ($d_{50}=1.37$ μm) approaching the starting median particle size, and remarkably high Vickers (HV1) and Knoop (HK2) hardness values ($2741.6\pm39.02$ kg/mm$^2$, $2110.3\pm15.03$ kg/mm$^2$, respectively).

A process according to the present invention is based on the basic process proposed by Prochazka et al. in which graphite and $B_4C$ additives serve as sintering aids and grain growth inhibitors. The process proposed by Prochazka et al. is modified to include a titanium source that is converted to very fine scale and well dispersed $TiO_2$ during thermal decomposition. However, in a processing according to the present invention, the carbon content is more than 2% relative to the weight of SiC while the prior art (Prochezka's process discussed in the background) used carbon content of below 1% wt. During subsequent pressureless sintering, the $TiO_2$ extracts a portion of the graphite and $B_4C$ to form $TiB_2$. The fine grain size of the post-HIPed SiC, as well as the presence of well dispersed (approximately 0.48 μm) high-hardness $B_4C$ and $TiB_2$ phases (in addition to a diminished concentration of graphite), contribute to achieving a disruptive increase in hardness for a SiC-based product produced with pressureless sintering.

Introduction of carbon and titanium-bearing sources in the form of water-soluble liquids, careful selection of C, $B_4C$, and Ti additive concentrations, which yields adequate residual $B_4C$ after conversion of $TiO_2$ to $TiB_2$, optimized sintering soak temperatures, and utilization of sub-micron SiC and $B_4C$ powders result in SiC articles with unexpected characteristics.

A processing according to the present invention produces a SiC-based product, which is near-net-shaped (i.e. has the same shape of the green body) and includes only silicon carbide, titanium, boron carbide, carbon, and unavoidable impurities (below 1% of the total weight for the impurities).

Procedure

The following is a description of examples of starting materials and examples of processes for the fabrication of SiC-based articles/products according to the present invention.

Further disclosed are characterization methods used to evaluate the fabricated SiC-based specimens prepared with a process according to the present invention.

High purity alpha silicon carbide powders from UK Abrasives (Northbrook, Ill.) and Superior Graphite (Chicago, Ill.) were used for making the specimens disclosed herein. The median ($d_{50}$) particle sizes were reported by the manufacturers to be 0.5 and 0.7 μm, respectively.

$B_4C$ powder (H. C. Starck, HS grade, $d_{50}=0.8$ μm) was mixed with incremental additions of a water-soluble source of titanium and a water-soluble source of carbon in the preparation of the specimens disclosed herein.

An aqueous solution of (pH 7-8) made up of 50 wt % of dihydroxybis (ammonium lactato) titanium (IV), $C_6H_{10}O_8Ti.2(NH_4)$ (Alfa Aesar, Ward Hill, Mass.) was used as the titanium source.

The carbon source was a water-soluble phenolic resin (SP-6877, SI Group, Schenectady, N.Y.). This resin produced 48.02 wt % carbon char following pyrolysis at 1000° C. in flowing Ar.

A standard binder system composed of 1 wt % polyvinyl alcohol (PVA), 0.5 wt % polyethylene glycol (PEG) plasticizer, and 1 wt % Darvan 821A dispersant (R.T. Vanderbilt Company, Norwalk, Conn.) was used in the preparation of all the specimens disclosed herein.

The first group of specimens were prepared with SiC from UK Abarsives. One kilogram of SiC powder was used with different amounts of Ti, C, and boron carbide to prepare twelve specimens with different compositions. Table 1 discloses the amounts (in grams) of Ti, C, and boron carbide for specimens 1-12. In each case, an appropriate amount of titanium source and an appropriate amount of carbon source were used to obtain the amounts of titanium and carbon after application of a thermal decomposition step (e.g. pyrolysis). The mass of the elemental titanium added to the batch was calculated based on the molar mass ratio of Ti to $C_6H_{10}Ti.2(NH_4)$ of 16.277 wt %, and the mass of the carbon added was calculated based on the residual carbon char weight after pyrolysis of phenolic resin. The higher carbon concentration (2.963 wt %) was selected to approach the concentration which performed well in the boron carbide process mentioned in the background. The effect of a lower carbon content (2.50 wt %) was also investigated in a different study (second group).

The relative weight percentages expressed herein are based on 1000 grams of silicon carbide (dry weight) used to prepare the slurry, and the final weight value of each component in Table 1. Thus, for example, composition 10 included 2.963% (about 3%) carbon, 1.059% (about 1%) titanium, and 0.969% (about 1%) boron carbide, all percentages being based on the relative weight of the component to the total dry weight of silicon carbide in the slurry.

TABLE 1

Initial Study Compositions Based on 1 kg of UK Abrasives SiC Powder

| Composition | C (g) | Ti (g) | $B_4C$ (g) |
|---|---|---|---|
| 1 | 18.02 | 10.59 | 3.59 |
| 2 | 18.02 | 15.88 | 3.59 |
| 3 | 18.02 | 21.18 | 3.59 |
| 4 | 29.63 | 10.59 | 3.59 |
| 5 | 29.63 | 15.88 | 3.59 |
| 6 | 29.63 | 21.18 | 3.59 |
| 7 | 18.02 | 10.59 | 9.69 |
| 8 | 18.02 | 15.88 | 9.69 |
| 9 | 18.02 | 21.18 | 9.69 |
| 10 | 29.63 | 10.59 | 9.69 |
| 11 | 29.63 | 15.88 | 9.69 |
| 12 | 29.63 | 21.28 | 9.69 |

To prepare the first group of specimens, first the silicon carbide powder was suspended in deionized water mixed with: the water-soluble titanium source; the water-soluble carbon source; soluble organic pressing/binder agents; and the boron carbide powder. The suspensions were held in high-density polyethylene (HDPE) containers. Each suspension formed a slurry.

The agitated slurries were then spray dried to obtain a powder mass in which the SiC particles and the boron carbide particles were coated with the titanium source and the carbon source.

Spray dried granulated powder of each composition from Table 1 was uniaxially pressed into six cylindrical disks of 4.445 cm in diameter and approximately 8 mm in height using a tool steel die under 20 MPa of pressure in a hydraulic hand press. All disks were then placed into latex bags which were subsequently evacuated using a mechanical vacuum pump and sealed. The evacuated bags containing the disks were cold isostatically pressed (CIP, American Isostatic Presses, Inc., Columbus, Ohio) in a water/oil mixture at 345 MPa for 2 minutes in order to improve green density and mitigate non-uniformities in particle packing resulting from the previous uniaxial pressing step.

After CIPing, the weight and caliper-based dimensions of the disks were measured. The compacts (green bodies) were then placed in graphite crucibles in a tungsten heating element thermolysis vacuum furnace (BREW, Thermal Technology Inc., Santa Rosa, Calif.) and heat treated under a slow (0.5° C./min) heating rate to 1000° C. under mechanical pump vacuum (10-100 Pa) to thermally decompose the titanium source, the carbon source, and the binder, that coated the particles in the SiC powder.

The disks were then pressureless sintered in a vacuum furnace (System VI, Centorr Vacuum Industries, Nashua, N.H.) with graphite heating elements and insulation, and a water-cooled steel housing. Each one of the six disks of a composition from Table 1 was heated under mechanical pump vacuum at 10° C./min to a respective, selected soak temperature (pressureless sintering temperatures: 2000°, 2040°, 2080°, 2120°, 2160°, or 2200° C.) and held for 30 minutes at its soak temperature. The disks were then cooled at the natural cooling rate of the furnace with the heating elements turned off.

Following sintering, the geometric or Archimedes densities of all the disks were measured. Selected disks were then hot isostatically pressed (HIPed) at 1900° C. under 207 MPa of argon gas pressure for a soak period of 1 hour. After HIPing, the Archimedes density was again measured for each disk that was subjected to HIPing.

The theoretical density values used to calculate the relative densities of the disks were determined by the rule of mixtures based on as-batched compositions, correcting for reaction of titanium dioxide with boron carbide and carbon (described further below), but neglecting any reaction of graphite or $B_4C$ with the silica coating of SiC particles and any solid solution formation between $B_4C$ and SiC according to the following:

$$\rho_{composite} = \rho_{SiC}V_{SiC} + \rho_{TiB2}V_{TiB2} + \rho_C V_C + \rho_{B4C}V_{B4C}$$

where $\rho$ and V represent the theoretical density and volume fraction of each phase (SiC, $TiB_2$, graphite, and $B_4C$) in the mixture, respectively.

The theoretical density values used for SiC, $TiB_2$, graphite, and $B_4C$ were 3.21, 4.50, 2.16, and 2.52 g/cm³ respectively.

TABLE 2

Second Study Compositions 13-24 Based on 1 kg of Superior Graphite SiC

| Composition | C (g) | Ti (g) | $B_4C$ (g) | Ti/$B_4C$ molar ratio |
|---|---|---|---|---|
| 13 | 29.63 | 10.59 | 9.69 | 1.26 |
| 14 | 29.63 | 33.24 | 22.91 | 1.67 |
| 15 | 29.63 | 64.56 | 41.62 | 1.79 |
| 16 | 29.63 | 10.59 | 13.23 | 0.92 |
| 17 | 29.63 | 33.24 | 26.36 | 1.46 |
| 18 | 29.63 | 64.56 | 44.94 | 1.66 |
| 19 | 25.00 | 10.59 | 9.69 | 1.26 |
| 20 | 25.00 | 33.24 | 22.91 | 1.67 |
| 21 | 25.00 | 64.56 | 41.62 | 1.79 |
| 22 | 25.00 | 10.59 | 13.23 | 0.92 |
| 23 | 25.00 | 33.24 | 26.36 | 1.46 |
| 24 | 25.00 | 64.56 | 44.94 | 1.66 |

A second group of specimens were prepared with Superior Graphite SiC powder based on compositions in Table 2. In this case, as was the case in the first group, one kilogram of SiC powder was used for each composition. The amounts of the titanium source and the carbon source were selected to obtain the amounts of titanium and carbon shown in Table 2 after thermal decomposition of the titanium source and the carbon source. The relative weight percentages expressed herein are based on 1000 grams of silicon carbide (dry weight) used to prepare the slurry, and the final weight value of each component in Table 2. Thus, for example, composition 16 included 2.963% (about 3%) carbon, 1.059% (about 1%) titanium and 1.323% (about 1.3%) boron carbide, all percentages being based on the relative weight of the component to the total dry weight of silicon carbide in the slurry.

Compositions in Table 2 were designed as incremental changes around the Ti/$B_4C$ mass ratio of specimen 10 (Table 1) examined in the first composition matrix. The sintering soak temperatures (six soak temperatures), each for a specimen of a given composition in the second group, were shifted lower relative to the first group. The sintering soak temperatures for the specimens of the second group were: 1920°, 1960°, 2000°, 2040°, 2080°, and 2120° C. The specimens were otherwise processed and analyzed in the same manner as the specimens in the first group.

The Ti/$B_4C$ molar ratios in the Table 2 are based on the as-batched masses of these constituents ($T_i$ and $B_4C$ molar masses: 47.867 and 55.255 g/mol, respectively).

Square tiles of 10.2 cm×10.2 cm×6.98 mm thick, (dimensions after sintering and post-HIPing) were prepared from spray dried powder of composition 16 (Table 3). The tiles were uniaxially pressed at 110 MPa, and otherwise processed and characterized as previously described. Post-HIPed relative density and hardness for a sample from such a tile were based on a sintering soak temperature of 2000° C.

To prepare for hardness and microstructure evaluations, post-HIPed specimens were encapsulated in SpeciFix resin (Struers, Inc., Westlake, Ohio), and the outer porous and graphite-rich surface was ground away using a 220 grit diamond-coated grinding plate, as well as metal-bonded diamond media plates combined with 45, 15, and 9 μm diamond suspensions (Struers Piano, as well as Apex Band Metadi Supreme, Buehler, Lake Bluff, Ill.). The specimens were washed with deionized water following each grinding step. After grinding to flat surfaces, the specimens were polished on specialized cloths with 9, 3, and 1 μm polycrystalline diamond suspensions (Struers MD, and Texmet and Metadi Supreme, Buehler). After each polishing step, the specimens were washed and placed in an ultrasonicating bath to remove residual diamond particles from the polished surfaces.

Polished surfaces were indented at arbitrary and unbiased microstructural locations using a Vickers diamond indenter (Duramin-2, Struers, Westlake, Ohio, USA) under an applied load of 1 kg for 15 seconds. Vickers HVI (1 kg load) hardness measurements were calibrated using the SRM 2831 tungsten carbide standard reference disk (National Institute for Standards and Technology, Gaithersburg, Md.). The diagonal lengths often acceptable indentations (as set forth by ASTM standards) were measured and average hardness values, as well as standard deviations, (in units of kg/mm$^2$) were calculated. Knoop HK2 (2 kg load, applied for 15 s) hardness measurements (Duramin-2, Struers, Westlake, Ohio, USA) were also performed on a ground/polished fractured interior region of a 10.2 cm×10.2 cm tile of composition 16. Knoop hardness measurements were also calibrated using the SRM 2831 tungsten carbide standard reference disk. The diagonal lengths of ten acceptable indentations were measured and average hardness values, as well as standard deviations, in units of kg/mm$^2$, were calculated.

For selected samples, e.g. after thermal decomposition in the preparation of a specimen having composition 16 at 1000° C., or those which exhibited high post-HIPed relative densities (i.e., >98%), phases present were identified via X-ray diffraction (XRD, X'Pert PRO Alpha-1, PANalytical, Almelo, The Netherlands), from polished surfaces at a 0.084°/s scan speed, a step size of 0.017°, and a 2θ range of 10° to 85°. Soller slits corresponding to 0.04 radians were installed in the incident and diffracted x-ray beam pathways in order to produce scans with minimal background interference relative to the intensities of the diffraction peaks. Additionally, a 10 mm mask was installed in the incident beam pathway, and a 5 mm mask was installed in the diffracted beam pathway. The XRD pattern after the thermal decomposition step in the preparation of specimen 16 was the average of multiple scans over 8 hours.

For additional XRD analysis, the $C_6H_{10}O_8Ti2(NH_4)$ additive was dried at 60° C. for 12 hours, and then loaded into a SiC crucible, a graphite crucible, or mixed with $B_4C$ and particulate graphite (Lonza, Fair Lawn, N.J.) in a graphite crucible, and heated at 3° C./min to 1000° C. and held for 1 hour under continuous-pumping mechanical pump vacuum. The latter mixture had relative percentages emulating composition 16, though devoid of SiC powder.

The microstructures of the post-HIPed samples were examined using optical microscopy (Olympus BX40, Olympus America, Inc., Center Valley, Pa.), and scanning electron microscopy (SEM, performed by EBSD Analytical, Lehi Utah, using a Philips model XL-30 FEG SEM). Energy dispersive spectroscopy (EDS) was used for elemental analysis (EDAX Octane EDS detector). The presence of specific compounds were confirmed using an electron backscatter detector (EBSD, Hikari TSL/EDAX EBAD) using the ICDD (International Center for Diffraction data) database. The accelerating voltage of the SEM was 20 kV with a spot size of 5 (approximately 3 nA current) and a working distance of 12 mm. The sample was tilted 70° in the chamber for EBSD collection. EDS/EBSD map scanning was over a 100×100 μm$^2$ area with a 0.1 μm step, yielding 1,115,578 data points. At 25 points/second, total scan times for each specimen were approximately 12 hours. Each polished specimen was ion-etched for 6 hours prior to scanning to remove any surface deformation, improving the quality of EBSD patterns.

The concentrations of second phases were determined via image analysis. EDS maps for Ti, C, and B were generated for six specimens, all on the same location in any given microstructure. Such maps identify regions rich in a particular element and display them as darkened as compared to remaining regions. Using EBSD, regions rich in Ti (by EDS) were confirmed to be $TiB_2$, and specific regions rich in B were confirmed to be $B_4C$. Regions uniquely rich in C were assumed to be graphite. For each EDS map of a particular phase, using a program written in Visual Basic 4.0, a greyscale threshold was assigned to identify pixels corresponding to the phase. Each pixel meeting the criteria was colored. Adjustments were made to the grayscale threshold until the colored regions visually best correlated to only, but completely, darkened regions in the EDS map. The fraction of pixels meeting the criteria relative to the total number of image pixels was taken to be the volume fraction of that phase (area fraction assumed equal to volume fraction). In the case of Ti, this was straightforward. For B and C, many regions indicated as carbon in the carbon EDS scan were also indicated as boron in the boron EDS scan. However, there were particular regions of boron in the boron scan that did not show corresponding regions of carbon in the carbon scan. EDS x-ray energies of boron and carbon are close, and it appears that part of the carbon distribution was picked up in the boron scans, but the boron-rich regions were not picked up in the carbon scans. Thus, after performing the scan for carbon in the carbon EDS map, these regions were excluded from being identified as being boron rich regions in the subsequent pixel analysis of the boron EDS map. Regions identified as Ti, B, and C were assigned a color and overlaid on a single image (Adobe Photoshop CS5) to show $TiB_2$, $B_4C$ and graphite regions in the microstructure. These regions were then converted to greyscale for the figures presented herein.

An optical micrograph of the highest-hardness specimen was analyzed using the linear intercept method to determine the cumulative percent finer grain size distribution and median ($d_{50}$) grain size of SiC grains for select samples based upon measurements across three separate microstructure images for a total of 200 measurements. To determine the grain size distribution of second phases ($TiB_2$ light phase and $C/B_4C$ dark phase in an optical micrograph), every second phase grain diameter was measured (longest diameter for non-circular grains) in the micrograph: 255 measurements for $TiB_2$ grains, 418 measurements for $C/B_4C$ grains.

II. Results and Discussion

The following is an analysis of the results (specimens) produced by the example processes disclosed above.

Group One

FIG. 1 shows the sintered geometric densities and sintering soak temperatures for the specimens in group 1. Specimens based on compositions 7 and 10 sintered to higher relative densities than the specimens of the other compositions. It is interpreted that the titanium additive converted to $TiO_2$ after the thermal decomposition step (further discussed below), and then reacted with $B_4C$ and C according to the following:

$$2TiO_{2(s)}+B_4C_{(s)}+3C_{(s)}=2TiB_{2(s)}+4CO_{(g)}. \qquad (1)$$

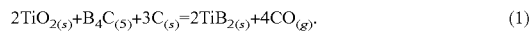

The residual boron carbide (in vol %); i.e. that remained after its extraction by this reaction, was calculated by converting the weights in Table 1 using molar masses and theoretical densities, and recognizing that one half mole of $B_4C$ was extracted for every mole of $TiO_2$ provided (the moles of $TiO_2$ are equal to the moles of Ti, in turn converted from the weights of Ti indicated in the table). Only compositions 7, 8, 10, and 11 had non-zero residual $B_4C$ (0.52 vol % for compositions 8 and 11, and 3.58 vol % for compositions 7 and 10). The higher residual $B_4C$ content compositions (7 and 10) resulted in the highest sintered relative densities indicating that the presence of residual $B_4C$ during sintering is essential to obtaining high sintered relative densities. Specimens with composition 10, which had a higher carbon content, displayed higher relative densities than specimen 7 at all soak temperatures. Significantly, some specimens with composition 10 sintered to a relative density at or above 93% (see FIG. 1).

The specimens exhibited graphite-rich layers covering their exterior surfaces after sintering. These soft and porous coatings resulted in measurement of artificially low geometric sintered relative densities (FIG. 1) relative to the disk cores. These layers (~1 mm thick) were removed with coarse sandpaper and Archimedes density measurements were performed on specimens of composition 10 after sintering at various soak temperatures and post-HIPing (FIG. 2). Samples exposed to sintering soak temperatures in the range 2080-2200° C., reaching relative densities at or above ~95.5%, HIPed to higher relative densities, i.e. above 98.5%. Despite relative density values below 100%, some post-HIPed samples exhibited only open porosity (i.e., porosity near the outer surface) and no (interior) closed porosity; both can be individually-measured using Archimedes' method. The negative values of closed porosity indicated in the figure for some samples are considered to be from some deviation from the calculated composition used for the determination of theoretical density, based on the rule of mixtures.

Vickers hardness on specimens of composition 10, sintered at soak temperatures of 2080°, 2120°, and 2160° C., and then post-HIPed, were 2675.8±46.0, 2730.1±57.5, and 2625.0±59.4 kg/mm², respectively. Samples exposed to sintering soak temperatures of 2000° and 2040° C. were not evaluated due to low post-HIPed relative densities. The sample exposed to a sintering soak temperature of 2220° C. was not evaluated for hardness because of a coarse fracture surface indicative of extensive abnormal grain growth.

Group Two

In the first study, specimens with compositions 7 and 10 sintered most favorably because of adequate residual $B_4C$. Thus, compositions 13-24 for the second group (based on a different SiC source) were formulated around these compositions, i.e. compositions with higher carbon and residual boron carbide contents. Relative (Archimedes) densities after sintering these compositions at various soak temperatures are shown in Table 3 and FIG. 3. With this lower temperature matrix of sintering soak temperatures (as compared to the first study), relative densities (in nearly all cases) increased with increasing sintering soak temperature. These specimens demonstrated a significantly thinner near-surface porous/graphitic layer (approximately 0.1 mm).

TABLE 3

Sintered Relative Densities (%) of Second Study Compositions

| Composition | Sintering Soak Temperature (° C.) | | | | | |
|---|---|---|---|---|---|---|
| | 1920 | 1960 | 2000 | 2040 | 2080 | 2120 |
| 13 | 82.02 | 86.59 | 91.14 | 94.55 | 96.58 | 97.43 |
| 14 | 74.18 | 79.84 | 85.06 | 89.62 | 93.53 | 95.54 |
| 15 | 63.29 | 64.83 | 72.96 | 77.53 | 79.26 | 77.54 |
| 16 | 84.15 | 88.83 | 93.06 | 96.26 | 98.03 | 98.84 |
| 17 | 81.20 | 86.23 | 90.68 | 94.47 | 97.18 | 98.29 |
| 18 | 71.19 | 76.28 | 79.34 | 85.21 | 88.46 | 90.79 |
| 19 | 80.86 | 84.90 | 89.55 | 93.10 | 95.46 | 96.45 |
| 20 | 73.67 | 78.73 | 82.95 | 86.93 | 91.13 | 93.58 |
| 21 | 63.62 | 66.84 | 70.70 | 74.56 | 79.79 | 76.21 |
| 22 | 83.46 | 87.83 | 92.06 | 95.29 | 97.35 | 97.97 |
| 23 | 79.80 | 84.53 | 88.80 | 92.79 | 95.65 | 97.02 |
| 24 | 66.67 | 71.12 | 68.42 | 74.84 | 85.27 | 85.49 |

Based on the Archimedes densities of samples sintered at 2080° C. versus (as-batched) $Ti/B_4C$ molar ratio shown in FIG. 4, a $Ti/B_4C$ molar ratio at or below ~1.6 appeared to achieve high sintered relative densities with some samples having a $Ti/B_4C$ ratio of slightly above 1.6 also showing respectable relative density values (e.g. specimens of composition 14 sintered at the highest two soak temperatures). From reaction stoichiometry, a ratio below 2 is required for there to be any residual $B_4C$ in the microstructure. However, these data imply that a titanium to boron carbide molar ratio below 1.7 and preferably below about 1.6 may be generally required to have adequate remnant $B_4C$ to function as a sintering aid to attain relative densities above 93%, and certainly above 95%. It is also clear from the figure that for a given $Ti/B_4C$ molar ratio, the higher carbon content of the two yielded higher sintered relative densities.

The post-HIPed Archimedes densities of the specimens based on eight compositions which sintered to the highest relative densities are shown in FIG. 5. A sintering soak temperature of 2080° C. was the lowest at which the preponderance of compositions post-HIPed to near or at theoretical density. Specimens based on composition 16 were the only exception, HIPing to full density after sintering at a soak temperature of 2040° C. For the 2080° C. soak temperature, specimens based on compositions 13, 16, and 17 all reached theoretical density. In common for these three compositions were the higher carbon content (29.63 g or 2.963%), and $Ti/B_4C$ ratios below 1.6. Specimens based on compositions 14, 19, 22 and 23 for this soak temperature had post-HIPed relative densities below the theoretical value. The latter three of these specimens had the lower carbon content (25.00 g or 2.5%). Composition 14 had a $Ti/B_4C$ molar ratio of 1.67, which was above the preferred molar ratio of 1.6 required for sintering to high relative density but not by much, indicating that 1.7 would be a reasonable maximum value for the ratio of titanium to boron carbide. The relative densities of specimens based on compositions 15, 18, 20, 21, and 24 (all of which had $Ti/B_4C$ ratios above 1.6) were all so low that post-HIPing was not performed.

Characterization

Figure 6:
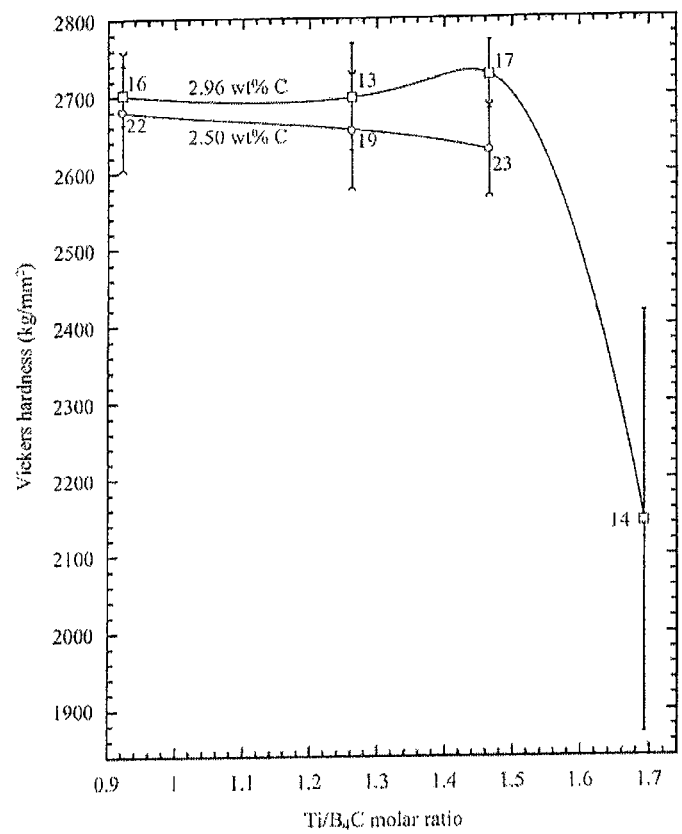
FIG. 6 discloses average Vickers hardnesses for selected post-HIPed specimens prepared according to the present invention, which were exposed to a sintering soak temperature of 2080° C. Error bars represent±standard deviations. Error bars with flat ends are for 2.96 wt % C specimens, while those with curved ends are for 2.50 wt % C specimens.

Vickers hardnesses of several second study (Table 2 compositions) post-HIPed specimens exposed to a sintering soak temperature of 2080° C. and post-HIPed, as a function of (as-batched) $Ti/B_4C$ molar ratio, are plotted in FIG. 6. Specimens with higher carbon contents exhibited higher hardness values and lower standard deviations (with the exception of a low-hardness specimen based on composition 14). Hardness was relatively invariant with $Ti/B_4C$ molar ratio in the range 0.92-1.46, exhibiting values of 2700 kg/mm² or higher. Higher carbon concentrations in the microstructure would normally be expected to lower hardness, but in this case, and contrary to common knowledge in this field, the consumption of graphite in reaction with titania (see subsequent discussion) as well as reaction to remove silica coatings on SiC particles require higher concentrations of graphite. In other words, contrary to common knowledge, in a process according to the present invention, increasing the amount of carbon in the composition unexpectedly contributes to the increasing hardness rather than decreasing the hardness of the sintered article.

Vickers hardness values for the highest hardness specimens and sintering soak temperatures for both groups are shown in Table 4. The slightly higher hardness of specimens from composition 10 may be a result of its finer starting SiC particle size, yielding a finer final grain size. Hardnesses of ceramics are known to increase with decreasing grain size (Hall-Petch relation); further improvements in hardness may be achieved by exploring SiC powders of even finer $d_{50}$.

TABLE 4

Vickers Hardness Values of Highest Hardness Compositions

| Composition and Sintering Soak Temperature | Vickers Hardness (HV1, kg/mm) |
|---|---|
| 10, 2120° C. | 2730.1 ± 57.52 |
| 13, 2080° C. | 2697.9 ± 69.36 |
| 16, 2080° C. | 2702.1 ± 38.52 |
| 17, 2080° C. | 2726.6 ± 44.40 |
| 16 (10.2 × 10.2 cm), 2000° C. | 2741.6 ± 39.02 |

The highest hardness in Table 5 was for a 10.2 cm×10.2 cm tile based on composition 16, with a sintering soak temperature of 2000° C. This composition was selected for a scaled-up part because it had a relatively low additive concentration, lowering cost and minimizing added weight associated with the higher theoretical density $TiB_2$ constituent. The improved hardness of the larger 10.2 cm×10.2 cm part may be attributable to the tendency for HIPing to be more effective on larger samples, as well as the lower sintering soak temperature, facilitating a more fine-scale microstructure (see subsequent discussion). In addition to the measured Vicker's hardness of 2741.6±39.02 kg/mm², it had a Knoop hardness of 2110.3±15.03 kg/mm². This is 18.8% (Vickers) higher than that of Hexyloy Enhanced sintered SiC (2308.1±87.96 and 1975.9±57.53 kg/mm², Vickers and Knoop, respectively). It was also 4.1% (Vickers) higher than PAD-$B_4C$ (2632.4±111.68 and 2098.5±24.87, Vickers and Knoop, respectively), which, in the literature, is reported as harder than SiC. Hexyloy Enhanced and PAD-$B_4C$ are well-known commercial armor ceramics. The literature and presently-presented hardness measurements were performed on the same instrument using the same methodology. It should be noted that the standard deviation of composition 16 hardnesses (both Vickers and Knoop) is substantially narrower than those of the other armor ceramics, implying a greater point-to-point microstructural uniformity.

Figure 7:
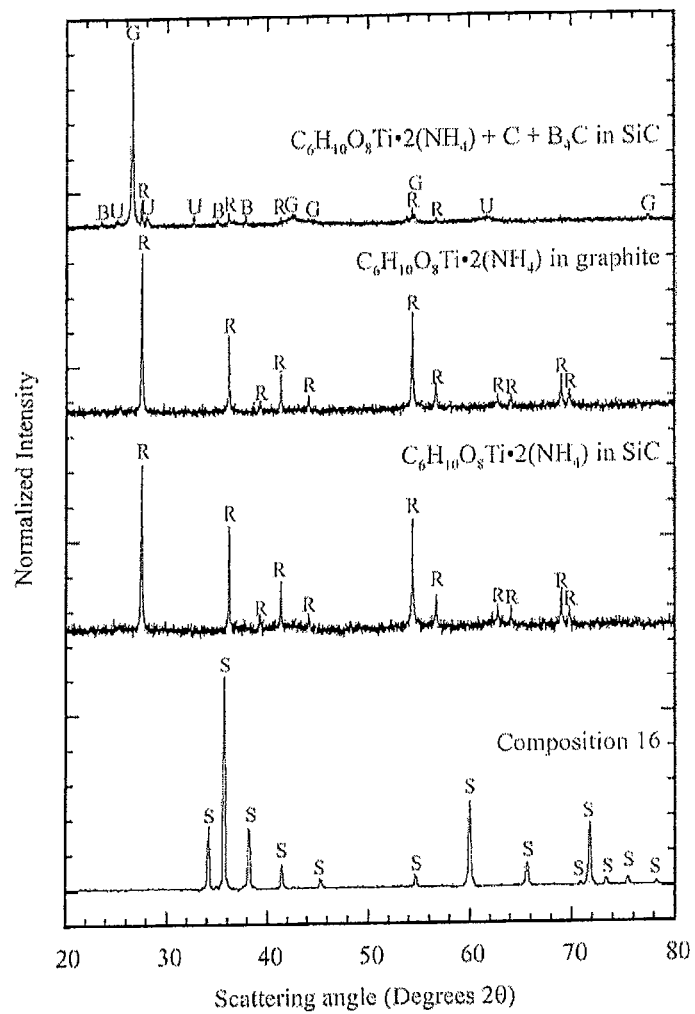
FIG. 7 discloses an XRD pattern (with a high resolution scan for an eight hour period) for a specimen prepared with a process according to the present invention after thermolysis/ pyrolysis heat treatment at 1000° C., as well as lower resolution scans of $C_6H_{10}O_8Ti.2(NH_4)$ placed in SiC or graphite crucibles, or mixed with graphite and $B_4C$ powder, placed in a SiC crucible. S: SiC. (6H SiC, 1CDD: 01-075-8314), B: $B_4C$ (ICDD: 00-035-0798), R: $TiO_2$ (Rutile, ICDD: 00-021-1276), G: (Graphite, ICDD: 00-056-0159).

FIG. 7 shows a high-resolution XRD trace of a specimen based on composition 16 after thermal decomposition. Only α-SiC was identified, with no indication of the presence of $B_4C$, graphite or a titanium-based phase (e.g. $TiO_2$ in the form of rutile or anatase, TiC, or $TiB_2$). When the $C_6H_{10}O_8Ti.2(NH_4)$ additive alone was heat-treated to 1000° C. in vacuum, in contact with either SiC or graphite crucibles, $TiO_2$ (rutile) was detected. In a mixture of graphite powder, $B_4C$, and $C_6H_{10}O_8Ti.2(NH_4)$ heat treated to 1000° C., $TiO_2$ was detected in diminished apparent concentration (based on peak intensities) along with $B_4C$ and graphite. These results imply that when heat-treated alone, $C_6H_{10}O_8Ti.2(NH_4)$ converts to $TiO_2$ on an adequately coarse scale to be easily detected by XRD. In the presence of SiC, $B_4C$, and graphite particles (composition 16), it forms $TiO_2$ coatings on these particles on such a fine scale as to be below the detection limit of XRD (i.e. x-ray amorphous) at this concentration.

Figure 8:
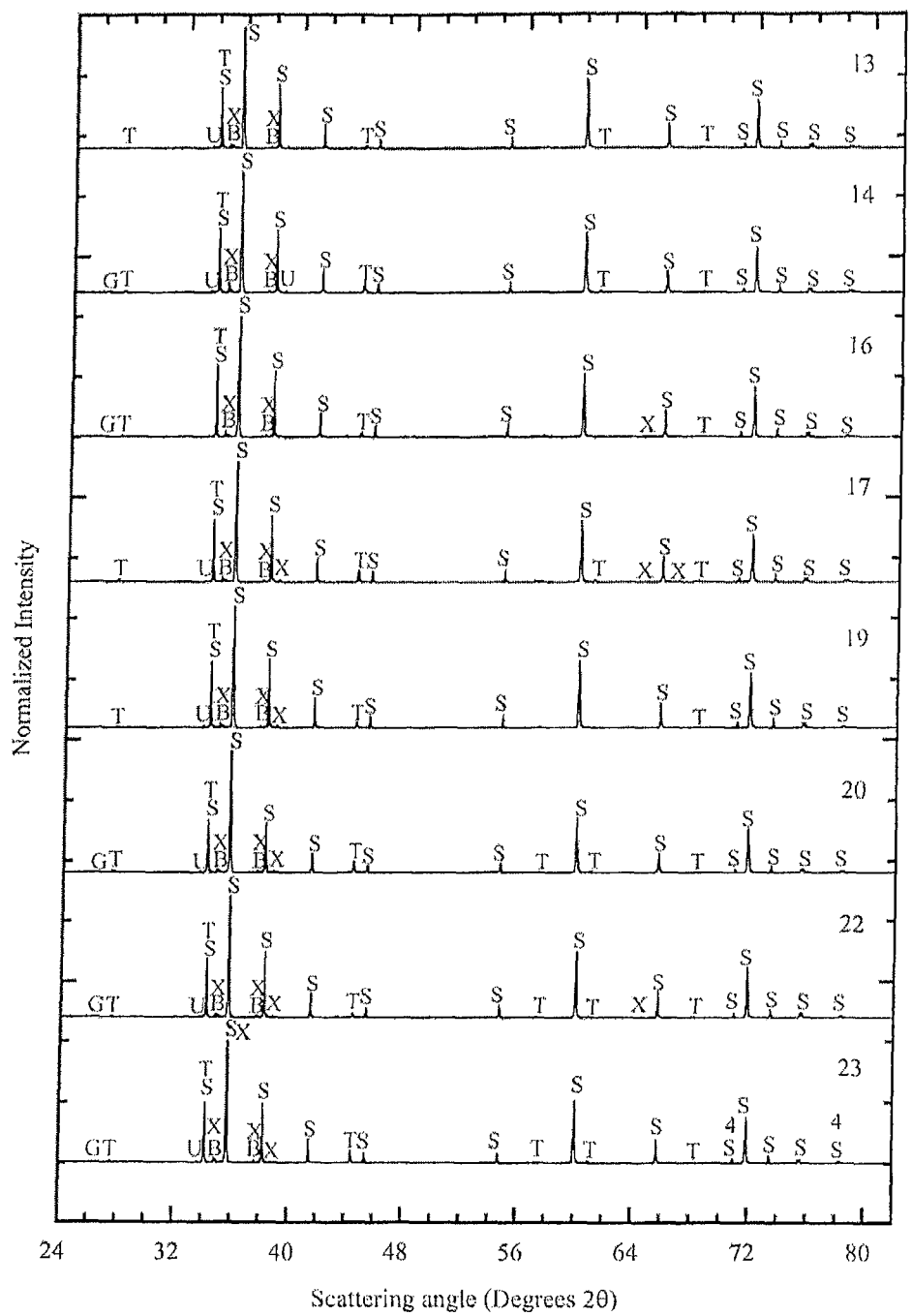
FIG. 8 discloses XRD scans for selected specimens prepared according to the present invention sintered at 2120° C. and post-HIPed. S: SiC (6H SiC, 1CDD: 01-075-8314), X: SiC (rhombohedral, ICDD: 00-049-1429), T:$TiB_2$ (ICDD: 00-008-0121), B:$B_4C$: (ICDD: 00-035-0798), G:graphite (ICDD: 00-056-0159).

X-ray diffraction analysis of the specimens in the second group that sintered and post-HIPed to the highest relative densities (specimens from compositions 13, 14, 16, 17, 19, 20, 22, and 23) indicated the presence of SiC, graphite, $B_4C$, and $TiB_2$ phases (FIG. 8). The presence of $B_4C$ cannot be definitively confirmed since the peaks overlap with rhombohedral SiC, however, the presence of $B_4C$ was confirmed through another method (EBSD, discussed shortly). The normalized relative peak intensities for the most intense $TiB_2$ peak (44.6° 2θ) are consistent in trend with that expected from the as-batched Ti weight percents in Table 3. Note that for specimens based on composition 16; for example, $TiB_2$ peaks are clear, whereas no Ti-based compound is apparent for this composition after heat-treating to 1000° C. (FIG. 7). This implies that relative to the 0.47 μm $TiB_2$ phase formed during sintering (shown later), the $TiO_2$ at 1000° C. would have been on a much finer scale.

Figure 9:
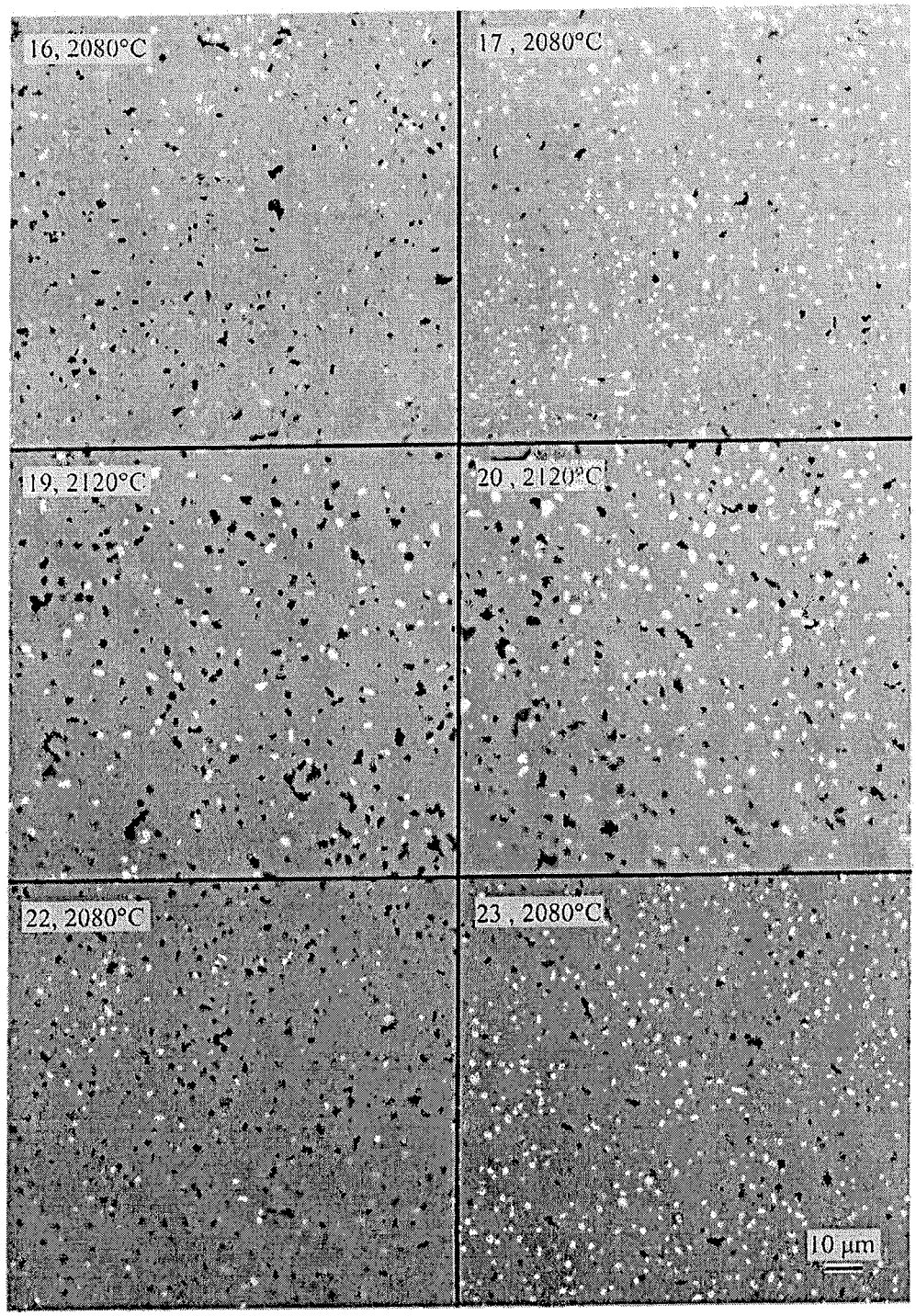
FIG. 9 discloses optical micrographs of polished surfaces of various sintered and post-HIPed specimens prepared with a process according to the present invention. Light colored phases are $TiB_2$. Dark colored phases are graphite and $B_4C$.

FIG. 9 shows optical micrographs of selected specimens based on compositions from the second groups (compositions 16, 17, 19, 20, 22, 23) which reached high relative density after post-HIPing. The second phases in samples 19 and 20, exposed to a sintering soak temperature of 2120° C., appeared coarsened relative to the specimens soaked at 2080° C. The lower 2080° C. sintering soak temperature is preferable in that the resulting finer microstructure generally yields higher hardness, which is consistent with the principle that the lowest sintering soak temperature which will yield a closed porosity state (to facilitate effective HIPing) is desirable.

The micrographs in FIG. 9 consist of three pairs (compositions 16-17, 19-20, 22-23); each pair showing a variation in as-batched Ti/$B_4C$ molar ratio, holding carbon content and sintering soak temperature constant (see Table 2). Specimens based on compositions 17, 20, and 23 have the highest as-batched Ti/$B_4C$ molar ratio for each pair. It is visually implied from the figure that these samples have a higher concentration of $TiB_2$ (light phase) and a lower concentration of graphite and $B_4C$ (dark phase) than the corresponding samples of lower as-batched Ti/$B_4C$ molar ratio (specimens based on compositions 16, 19, and 22, respectively).

TABLE 5

| | | Graphite in the Microstructure | | | | |
|---|---|---|---|---|---|---|
| | | Image Analysis | | Calculated | | |
| | | Graphite | | | | |
| Sample | Sintering Soak Temperature (° C.) | Graphite by Image Analysis (Vol %) | Graphite to SiC Volume Ratio | As-Batched Graphite (Vol %) | Graphite by Equation 1 (Vol %) | Graphite by Equation 2 (Vol %) |
| 16 | 2080 | 1.37 | 0.0145 | 4.10 | 3.60 | 4.32 |
| 17 | 2080 | 1.20 | 0.0147 | 3.93 | 2.38 | 4.59 |

TABLE 5-continued

Graphite in the Microstructure

| | | Image Analysis | | Calculated | | |
|---|---|---|---|---|---|---|
| Sample | Sintering Soak Temperature (° C.) | Graphite by Image Analysis (Vol %) | Graphite to SiC Volume Ratio | As-Batched Graphite (Vol %) | Graphite by Equation 1 (Vol %) | Graphite by Equation 2 (Vol %) |
| 19 | 2120 | 1.89 | 0.0203 | 3.50 | 2.98 | 3.71 |
| 20 | 2120 | 1.02 | 0.0118 | 3.35 | 1.75 | 4.00 |
| 22 | 2080 | 1.02 | 0.0110 | 3.48 | 2.97 | 3.69 |
| 23 | 2080 | 0.53 | 0.0061 | 3.34 | 1.75 | 3.99 |

Further confirmation that the intermediate form of the titanium batch additive is titania, which in turn results in the extraction of carbon (by equation 1) is complicated by the fact that $B_4C$ and graphite cannot be differentiated in optical micrographs (FIG. 9). FIG. 10 is an image analysis display based on SEM/EDS analysis of the same specimens as those in FIG. 9 (based on compositions 16, 17, 19, 20, 22, 23). Boron carbide phases were unambiguously confirmed by EBSD. Image analysis yielded the volume percentage of $TiB_2$, $B_4C$, and graphite for each microstructure. Volume percentages for graphite are listed in Table 5. Table 5 also shows the calculated volume percentage of carbon based on the assumption of no reactions except for formation of $TiO_2$ from $C_6H_{10}O_8Ti \cdot 2(NH_4)$ (density of $TiO_{2,rutile}$=4.23 g/cm$^3$), as well as calculated based on $TiO_2$ reduction to $TiB_2$ (equation 1). This is contrasted in the table to a calculated volume percentage of graphite under a case in which the $C_6H_{10}O_8Ti \cdot 2(NH_4)$ reduced to elemental titanium, which then reacted with batch constituents to form $TiB_2$:

$$2Ti + B_4C = 2TiB_2 + C \quad (2)$$

As can be seen, the reaction based on equation 2 is carbon producing, whereas the reaction based on equation 1 is carbon extracting (e.g. via production of gaseous CO). The calculated volume percentage graphite, by all three scenarios, were greater than those measured from image analysis. The calculation does not account for carbon extraction from reaction with an unknown amount of silica coatings on SiC particles. However, the trend of decreasing graphite concentration with increasing $C_6H_{10}O_8Ti \cdot 2(NH_4)$ addition (compare sample pairs 16-17, 19-20, and 22-23), is consistent with graphite-extracting equation 1. It could be concluded that higher Ti-additive and $B_4C$ concentrations would have a diluting effect on graphite volume percentage, even if graphite was unreactive. However, as expressed as a volume ratio of graphite to SiC in Table 5 (which would be independent of $TiB_2$ and $B_4C$ concentration), a decrease in ratio is observed with higher additive concentrations in two of the three pairs (no trend is apparent for samples 16 and 17).

On this basis it is concluded that the form of titanium which reacted with other batch additives was an oxide, and served to extract carbon from the microstructure. This has the advantage of a relatively high concentration of very hard $TiB_2$ second phase (along with hard $B_4C$ second phase), and diminished concentration of relatively soft graphite second phase, in the post-HIPed microstructure, facilitating higher hardness than a microstructure from a Prochazka-based batch composition.

Optical microscopy of the polished microstructure (FIG. 11) of a 10.2 cm×10.2 cm tile (composition 16 sintered with a 2000° C. soak temperature and post-HIPed) shows fine and well distributed second phases: graphite and $B_4C$ (dark) and $TiB_2$ (white). Thermal etching of the same polished sample revealed grain boundaries (FIG. 12). Quantitative characterization (via the linear intercept method) established the grain size distribution shown in FIG. 13. The median ($d_{50}$) SiC grain size of 1.37 μm is a close approach to the starting particle size of the original SiC powder $d_{50}$ of 0.7 μm (the SiC phase median grain size is no more than about 200% larger than the median particle size of the SiC particles in the SiC powder). The grain size distribution of the SiC developed herein is significantly narrow, and with a lower $d_{50}$, and further, having no grains larger than 4 μm. Image analysis of $TiB_2$ and graphite/$B_4C$ regions in FIG. 11 is shown in FIG. 14. $TiB_2$ had a $d_{50}$ of 0.47 μm, with a spread indicated by $d_{10}$ and $d_{90}$ values of 0.33 and 0.67 μm, respectively. The $d_{50}$ of the graphite/$B_4C$ phases is 0.49 μm, with a $d_{10}$-$d_{90}$ spread of 0.30 to 0.87 μm.

CONCLUSION

To summarize, the first study indicated that to attain relative density values above 90% the carbon content in the composition containing silicon carbide, carbon, titanium and boron carbide must be increased to above 2% (see Table 1, composition 10 and the discussion). Specifically, comparing specimens with composition 7 (1.802% carbon) and specimens with compositions 10 (2.963% carbon) would lead to the conclusion that increasing carbon (compositions 7 and 10 are only different in carbon content) could result in significant gains in relative density. To be specific, FIG. 1 indicates that increasing carbon content in specimens with composition 7 resulted in attaining about 20% increase in relative densities (see specimens of composition 10 in FIG. 1) for soak temperatures 2000°, 2050°, 2100°, 2150°, and 2200° C.

The second study was devised with compositions having a carbon content above 2% (2.5% and 2.963%), titanium content at or above the titanium content in composition 10 (at or above 1.059%) and boron carbide content at or above the boron carbide content of composition 10 (at or above 0.969%).

Specimens with composition 13 (same composition as composition 10 with a different silicon carbide powder) sintered to relative densities above 90% (see Table 3) when soak temperatures above 2000° C. were applied. The relative densities achieved with composition 13 were about the same as those for composition 10 for soak temperatures above 2000° C., indicating that the change in silicon carbide powder did not result in significant change in properties.

Table 3 further indicates that specimens with compositions having a titanium content at 6.456% did not sinter well (all below 90%), all specimens with carbon content of 2.963% and titanium content of 1.059% and 3.324% sintered well.

Specimens with a carbon content of 2.5% and titanium content of 1.059% sintered well, and at least specimens with a composition (composition 23) having 2.5% carbon, 3.324% titanium and boron carbide content 2.636% sintered well. Regarding specimens with composition 23, this composition is the same as composition 20 with a higher boron carbide content which resulted in a titanium to boron carbide content below 1.67 (composition 20). Indeed, Table 3 indicates that as a general rule specimens with compositions in which the molar ratio of titanium to boron carbide was above 1.7 (compositions 15, 21) or near 1.66 (compositions 18, 20, 24) did not sinter well. The exception are specimens of composition 14 sintered at the highest two soak temperatures, which had a titanium to boron carbide molar ratio of 1.67. Based on this data, it can be concluded that with compositions that include more than 2% carbon and 1.059% or more titanium, the titanium to boron carbide molar ratio cannot be more than 1.7 and is preferably less than 1.6.

Thus, the findings herein indicate that a silicon carbide based article/product that includes only carbon, titanium, boron carbide, silicon carbide and unavoidable impurities should include at least 2% carbon and a titanium to boron carbide molar ratio that is no more than 1.7 and preferably less than 1.6 in order to sinter well (above 90% relative density) using pressureless sintering at temperatures above 2000° C. to 2120° C.

The findings indicate that compositions with carbon content of 2% to about 3%, titanium content of about 1% to less than 4% and boron carbide content of about 1% to about 3% worked well to achieve high relative densities (above 90%, and some above 98%) as long as the molar ratio of titanium to boron carbide was below 1.7 and preferably below 1.6.

The data also indicates that when a process according to the present invention is properly controlled (proper selection of a composition and proper selection of a soak temperature) a SiC-based article may be attained in which the median grain sizes of the SiC phase (and preferably the titanium diboride phase and/or the graphite/boron carbide phases) are no more than 200% of the median particle size of the SiC particles in the SiC powder, which is advantageous in attaining certain high mechanical characteristics, specially high hardness.

The invention claimed is:

1. A process for fabrication of a SiC-based article, comprising:
preparing an aqueous suspension of SiC powder with a first amount of water soluble titanium compound that is convertible to $TiO_2$ by thermal decomposition, a second amount of water soluble carbon source, a third amount of boron carbide powder and a binder;
drying the aqueous suspension to obtain a powder mass containing the boron carbide and SiC particles coated with the binder, the titanium compound and the carbon source;
preparing a green body from said powder mass;
thermally decomposing said titanium compound and said carbon source coating the boron carbide and the SiC particles in said green body to convert said titanium compound to titanium dioxide and to covert the carbon source to carbon;
while pressureless sintering said green body, reacting the titanium dioxide, the carbon and the boron carbide to obtain titanium diboride and carbon monoxide gas after said thermally decomposing step to obtain a pressureless sintered body; thereby extracting carbon from said green body while pressureless sintering said green body.

2. The process of claim 1, further comprising hot isostatic pressing said pressureless sintered body.

3. The process of claim 1, wherein said median particle sizes of particles in said SiC and $B_4C$ powder are less than 1 micron.

4. The process of claim 1, wherein said water soluble titanium compound is ammonium lactato titanium (IV).

5. The process of claim 4, wherein said water soluble source of carbon is water soluble phenolic resin.

6. The process of claim 1, wherein said first amount is selected to produce a titanium content in said green body after thermal decomposition that is more than about 1% but less than 6.5% of the dry weight of the SiC powder for said aqueous suspension.

7. The process of claim 1, wherein said second amount is selected to produce a carbon content in said green body after thermal decomposition that is more than 2% but less than about 3% of the dry weight of the SiC powder for said aqueous suspension.

8. The process of claim 1, wherein said third amount is about 1% to less than 4.5% of the dry weight of said SiC powder in said aqueous suspension.

9. The process of claim 1, wherein said first amount is selected so that the molar ratio of titanium to boron carbide will be less than 1.7 after thermal decomposition.

10. The process of claim 1, wherein the aqueous suspension is spray dried.

11. The process of claim 1, wherein the first amount is selected to result in about 1.00% to less than 3.5% titanium content in said pressureless sintered body, said titanium content being measured as a percentage of the dry weight of said SiC powder in the aqueous suspension, the second amount is selected to result in more than 2% to less than about 3% carbon content, said carbon content being measured as a percentage of the dry weight of said SiC powder in the aqueous suspension, and said third amount is selected to result in about 1% to about 3% boron carbide content in said pressureless sintered body, said boron carbide content being measured as a percentage of the dry weight of said silicon carbide in said aqueous suspension.

12. The process of claim 11, wherein said titanium content is 1.059% and said carbon content is 2.963%.

13. The process of claim 12, wherein said boron carbide content is 0.969%.

14. The process of claim 12, wherein said boron carbide content is 1.323%.

15. The process of claim 11, wherein said pressureless sintering is carried out at a soak temperature above 2000° C.

16. The process of claim 11, wherein said first amount is selected to result in molar ratio of titanium to boron carbide in said pressureless sintered body that is below 1.7.

17. The process of claim 1, wherein the titanium compound includes an organometallic compound.

18. A process for fabrication of a SiC-based article, comprising:
preparing an aqueous suspension of SiC powder with a first amount of water soluble source of titanium, a second amount of water soluble carbon source and a third amount of boron carbide powder;
drying the aqueous suspension to obtain a first SiC-based powder mass containing SiC particles coated with the source of titanium and the carbon source;
preparing a green body from said SiC-based powder mass and a binder;
thermally decomposing said source of titanium and said carbon source in said green body; and pressureless sintering said green body after said thermally decomposing step to obtain a pressureless sintered body, wherein said water soluble source of titanium is ammonium lactato titanium (IV).

19. The process of claim 18, wherein said water soluble carbon source is water soluble phenolic resin.

* * * * *